(12) United States Patent
Mitsunaga et al.

(10) Patent No.: US 10,995,888 B2
(45) Date of Patent: *May 4, 2021

(54) TI-CONTAINING FERRITIC STAINLESS STEEL SHEET FOR EXHAUST PIPE FLANGE MEMBER, PRODUCTION METHOD, AND FLANGE MEMBER

(71) Applicant: NISSHIN STEEL CO., LTD., Tokyo (JP)

(72) Inventors: Seiji Mitsunaga, Tokyo (JP); Nobuhisa Ebihama, Tokyo (JP); Yasuhiro Ehara, Tokyo (JP); Kazunari Imakawa, Tokyo (JP)

(73) Assignee: NIPPON STEEL STAINLESS STEEL CORPORATION, Tokyo (JP)

( * ) Notice: Subject to any disclaimer, the term of this patent is extended or adjusted under 35 U.S.C. 154(b) by 203 days.

This patent is subject to a terminal disclaimer.

(21) Appl. No.: 16/098,150

(22) PCT Filed: Feb. 7, 2017

(86) PCT No.: PCT/JP2017/004349
§ 371 (c)(1),
(2) Date: Nov. 1, 2018

(87) PCT Pub. No.: WO2017/199482
PCT Pub. Date: Nov. 23, 2017

(65) Prior Publication Data
US 2019/0154177 A1    May 23, 2019

(30) Foreign Application Priority Data
May 16, 2016   (JP) .............................. JP2016-098323

(51) Int. Cl.
*C21D 8/02*    (2006.01)
*C22C 38/02*    (2006.01)
(Continued)

(52) U.S. Cl.
CPC ............ *F16L 23/032* (2013.01); *C21D 6/002* (2013.01); *C21D 6/004* (2013.01); *C21D 6/005* (2013.01);
(Continued)

(58) Field of Classification Search
CPC ........ C21D 6/002; C21D 6/004; C21D 6/005; C21D 6/008; C21D 8/005; C22C 38/001;
(Continued)

(56) References Cited

U.S. PATENT DOCUMENTS

2014/0294658 A1\* 10/2014 Nakamura ............ C22C 38/004
420/38
2016/0289786 A1\* 10/2016 Ishii ...................... C22C 38/005
(Continued)

FOREIGN PATENT DOCUMENTS

JP      60-228616      11/1985
JP      64-056822      3/1989
(Continued)

*Primary Examiner* — Scott R Kastler
(74) *Attorney, Agent, or Firm* — Clark & Brody LP

(57) ABSTRACT

A Ti-containing ferritic stainless steel sheet for an exhaust pipe flange member has a composition containing, in mass percentage, from 0.003 to 0.030% of C, 2.0% or less of S i, 2.0% or less of Mn, 0.050% or less of P, 0.040% or less of S, from 10.0 to 19.0% of Cr, 0.030% or less of N, from 0.07 to 0.50% of Ti, from 0.010 to 0.20% of Al, from 0 to 1.50% of Mo, and from 0 to 0.0030% of B, with the balance Fe and unavoidable impurities, has a K value of 150 or more, has a sheet surface hardness of 170 HV or less, and has a sheet thickness of from 5.0 to 11.0 mm. The K value equals $-0.07 \times Cr - 6790 \times Free(C+N) - 1.44 \times d + 267$, wherein Free(C+N) corresponds to the solid-dissolved (C+N) concentration (% by mass), and d represents an average crystal grain diameter (μm).

6 Claims, 1 Drawing Sheet

(51) Int. Cl.
  *F16L 23/032* (2006.01)
  *C21D 6/00* (2006.01)
  *C21D 8/00* (2006.01)
  *C21D 9/46* (2006.01)
  *C22C 38/00* (2006.01)
  *C22C 38/04* (2006.01)
  *C22C 38/06* (2006.01)
  *C22C 38/22* (2006.01)
  *C22C 38/28* (2006.01)
  *C22C 38/32* (2006.01)
  *F01N 13/16* (2010.01)
  *F01N 13/18* (2010.01)

(52) U.S. Cl.
  CPC ............ *C21D 6/008* (2013.01); *C21D 8/005* (2013.01); *C21D 8/0205* (2013.01); *C21D 8/0226* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/28* (2013.01); *C22C 38/32* (2013.01); *F01N 13/16* (2013.01); *F01N 13/1805* (2013.01); *C21D 2211/005* (2013.01); *F01N 2530/04* (2013.01)

(58) Field of Classification Search
  CPC ....... C22C 38/002; C22C 38/02; C22C 38/04; C22C 38/06; C22C 38/22; F01N 13/16
  See application file for complete search history.

(56) References Cited

U.S. PATENT DOCUMENTS

2019/0093192 A1* 3/2019 Mitsunaga ............ C22C 38/001
2020/0115785 A1* 4/2020 Teraoka .................. C22C 38/02

FOREIGN PATENT DOCUMENTS

| JP | 2012-140687 | 7/2012 |
| JP | 2012-140688 | 7/2012 |
| JP | 2015-187290 | 10/2015 |
| JP | 60-022097 | 11/2016 |
| WO | 2013/085005 | 6/2013 |

* cited by examiner

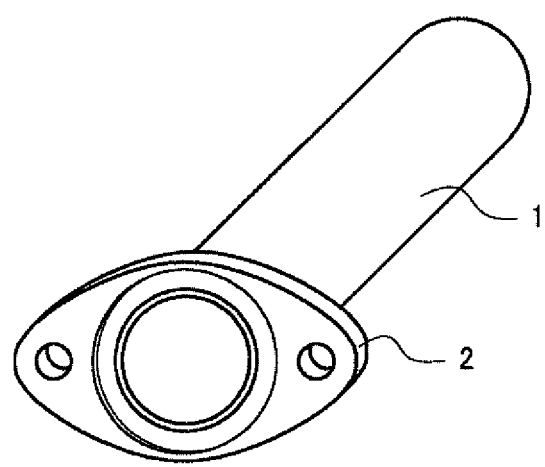

TI-CONTAINING FERRITIC STAINLESS STEEL SHEET FOR EXHAUST PIPE FLANGE MEMBER, PRODUCTION METHOD, AND FLANGE MEMBER

TECHNICAL FIELD

The present invention relates to a Ti-containing ferritic stainless steel sheet having a large gauge thickness excellent in toughness for being worked into an exhaust pipe flange member, and a method for producing the same. The invention also relates to a flange member using the Ti-containing ferritic stainless steel sheet. The exhaust pipe flange member herein is a steel member that is welded to an end of a steel pipe to be an exhaust pipe, and constitutes a flange portion bearing a fastening function of the exhaust pipe with another member.

BACKGROUND ART

An automobile exhaust gas flow path is constituted by various members including an exhaust manifold, a front pipe, a muffler, a center pipe, and the like. These members of an exhaust pipe are fastened with flange portions. FIG. 1 schematically exemplifies an external appearance of an exhaust pipe member having a flange portion. A flange member 2 is welded to an end of a steel pipe 1, so as to constitute the exhaust pipe member. The flange member 2 that is used in an exhaust pipe member is especially referred to as an "exhaust pipe flange member" in the description herein. The dimension and shape of the exhaust pipe flange member may slightly vary depending on the specification of the exhaust pipe, and the flange member is often produced by cold forging with a press mold. The flange member generally has a center large hole, through which an exhaust gas flows, and a hole for fastening with a bolt, and is generally subjected to cutting work.

For the exhaust pipe flange member, ordinary steels have been frequently used, but are being shifted to stainless steels in recent years from the standpoint of the corrosion resistance and the like. As the steel types applied thereto, there is a large need of a ferritic single phase steel types, which has a smaller thermal expansion coefficient and a smaller material cost than an austenitic stainless steel. Examples of the ferritic single phase steel types that is considered to be suitable for an exhaust pipe flange member of an automobile exhaust gas flow path from the standpoint of the material characteristics including the corrosion resistance, the heat resistance, and the like include a Ti-containing ferritic stainless steel.

A stainless steel material for being worked into an exhaust pipe flange member of an automobile exhaust gas flow path is often demanded to be a steel sheet having a large gauge thickness (for example, a sheet thickness of from 5.0 to 11.0 mm). However, in general, a ferritic single phase steel types has small low temperature toughness. In particular, a Ti-containing ferritic stainless steel is often pointed out as a steel types that is short in toughness in working from the steel sheet having a large gauge thickness to the flange member and in the severe impact test applied to the resulting flange member.

CITATION LIST

Patent Literatures

PTL 1: JP-A-60-228616
PTL 2: JP-A-64-56822
PTL 3: JP-A-2012-140688

SUMMARY OF INVENTION

Technical Problem

As a method for enhancing the toughness of the Ti-containing ferritic stainless steel sheet, PTL 1 describes a method of subjecting a steel sheet to quenching after the hot rolling, and coiling the steel sheet at a temperature of 450° C. or less. PTL 2 describes a method of increasing the hot rolling finishing temperature corresponding to the composition, and quenching the steel sheet with water after coiling. However, even though these measures are performed, the effect of improving toughness for the application to an exhaust pipe flange member becomes insufficient when a steel sheet has a large sheet thickness. PTL 3 describes a method of coiling a steel sheet at 570° C. or more to provide a coil, and after retaining the coil for 5 minutes or more in such a state that the outermost surface temperature of the coil is 550° C., immersing the coil in a water bath. However, a further enhancement of the low temperature toughness is demanded depending on the crystal grain diameter of the steel sheet.

For working into an exhaust pipe flange member, cold forging, boring, cutting, and the like are performed. Therefore, it is important that the steel sheet has good workability.

An object of the invention is to provide a steel sheet having a large gauge thickness of a Ti-containing ferritic stainless steel excellent in toughness and workability that is suitable for a material of an exhaust pipe flange member.

Solution to Problem

According to the studies made by the present inventors, it has been found that the toughness of a steel sheet having a large gauge thickness of a Ti-containing ferritic stainless steel is enhanced by decreasing the amounts of C and N that are solid-dissolved in the matrix of the ferritic phase, but the extent of the enhancement is largely influenced by the ferritic crystal grain diameter. The invention has been completed based on the knowledge.

The object can be achieved by the following inventions.

(1) A Ti-containing ferritic stainless steel sheet for an exhaust pipe flange member, having a chemical composition containing, in terms of percentage by mass, from 0.003 to 0.030% of C, 2.0% or less of Si, 2.0% or less of Mn, 0.050% or less of P, 0.040% or less of S, from 10.0 to 19.0% of Cr, 0.030% or less of N, from 0.07 to 0.50% of Ti, and from 0.010 to 0.20% of Al, with the balance of Fe and unavoidable impurities, having a K value defined by the following expression (1) of 150 or more, having a hardness of a sheet surface of 170 NV or less, and having a sheet thickness of from 5.0 to 11.0 mm:

$$K \text{ value} = -0.07 \times Cr - 6790 \times \text{Free}(C+N) - 1.44 \times d + 267 \qquad (1)$$

wherein in the expression (1), Cr represents a Cr content (% by mass) in the steel; Free (C+N) represents a value (% by mass) obtained by subtracting a total content (% by mass) of C and N present in an extraction residue recovered by an electrolytic extraction method, from a total content (% by mass) of C and N present in the steel; and d represents an average crystal grain diameter (Am) obtained for an observation surface obtained by a polished cross section (L cross section) in parallel to a rolling direction and a sheet thickness direction, by an intercept method with a linear testing line defined in Annex C of JIS G0551:2013.

(2) The Ti-containing ferritic stainless steel sheet for an exhaust pipe flange member according to the item (1), wherein the Ti-containing ferritic stainless steel sheet has the chemical composition further containing, in terms of percentage by mass, 1.50% or less of Mo.

(3) The Ti-containing ferritic stainless steel sheet for an exhaust pipe flange member according to the item (1) or (2), wherein the Ti-containing ferritic stainless steel sheet has the chemical composition further containing, in terms of percentage by mass, 0.0030% or less of B.

(4) A method for producing the Ti-containing ferritic stainless steel sheet for an exhaust pipe flange member according to any one of the items (1) to (3), containing:

a step of heating a slab of a steel having the chemical composition in a heating furnace, then taking out the slab at a temperature of from 950 to 1,120° C. from the furnace, rolling the slab with a roughing mill to provide an intermediate slab having a sheet thickness of from 20 to 50 mm and a surface temperature of from 700 to 850° C., then hot-rolling the intermediate slab to a thickness of from 5.0 to 11.0 mm, and then coiling at a surface temperature of from 650 to 800° C., so as to provide a hot rolled steel sheet; and a step of annealing the hot rolled steel sheet at from 800 to 1,100° C., thereby providing a hot rolled and annealed steel sheet having a hardness of a sheet surface of 170 HV or less.

(5) A flange member containing the Ti-containing ferritic stainless steel sheet according to any one of the items (1) to (3).

(6) The flange member according to the item (5), wherein the flange member is an exhaust pipe flange member of an automobile.

The "sheet surface" herein means the surface of the end in the sheet thickness direction. The hardness of the sheet surface can be obtained in such a manner that an indenter is pressed into the sheet surface, from which an oxidized scale has been removed, at HV 30 (test force: 294.2 N) according to JIS Z2244:2009.

Advantageous Effects of Invention

According to the invention, a steel sheet having a large gauge thickness of a Ti-containing ferritic stainless steel excellent in toughness and workability can be stably achieved. The steel sheet is significantly useful as a material for being worked into a flange member used in an exhaust pipe of an automobile exhaust gas flow path.

BRIEF DESCRIPTION OF DRAWING

FIG. 1 is an illustration schematically showing an external appearance of an exhaust pipe member having a flange portion.

DESCRIPTION OF EMBODIMENTS

Chemical Composition

The invention targets a ferritic stainless steel containing the following component elements. The percentage for the chemical composition of the steel sheet is percentage by mass unless otherwise indicated.

C hardens the steel and is a factor that reduces the toughness of the steel sheet. The C content (i.e., the total amount of solid-dissolved C and C present as a compound) is restricted to 0.030% or less. The C content is preferably 0.020% or less, and may be managed to 0.015% or less. An excessive decrease of C may increase the load on steelmaking and may increase the cost. A steel sheet having a C content of 0.003% or more is targeted herein.

Si and Mn are effective as a deoxidizing agent, and in addition, have a function that enhances the high temperature oxidation resistance. It is more effective to ensure the content of 0.02% or more for Si and 0.10% or more for Mn. Large amounts of these elements contained may be a factor that causes an embrittlement of the steel. The Si content is restricted to 2.0% or less, and more preferably 1.0% or less. The Mn content is also restricted to 2.0% or less, and more preferably 1.0% or less.

Large amounts of P and S contained may be a factor that reduces the corrosion resistance. The P content is allowed to be up to 0.050%, and the S content is allowed to be up to 0.040%. An excessive decrease of P and S may increase the load on steel making and may not be economically effective. In general, the P content may be controlled in a range of from 0.010 to 0.050%, and the S content may be controlled in a range of from 0.0005 to 0.040%.

Cr is important for ensuring the corrosion resistance as a stainless steel. Cr is also effective for enhancing the high temperature oxidation resistance. For exhibiting these functions, the Cr content is necessarily 10.0% or more. A large amount of Cr contained may harden the steel to impair the improvement of the toughness of the steel sheet having a large gauge thickness in some cases. A steel sheet having a Cr content of 19.0% or less is targeted herein.

N is a factor that reduces the toughness of the steel sheet as similar to C. The N content (i.e., the total amount of N that is present as a solid solution of N and a compound thereof) is restricted to 0.030% or less. The N content is preferably 0.020% or less, and may be managed to 0.015% or less. An excessive decrease of N may increase the load on steel making and may increase the cost. In general, the N content may be controlled in a range of 0.003% or more.

Ti forms a Ti carbonitride through bonding with C and N to suppress the segregation of a Cr carbonitride at the grain boundaries, and thus is an element that is considerably effective for retaining the corrosion resistance and the high temperature oxidation resistance of the steel. The Ti content is necessarily 0.07% or more, more effectively 0.09% or more, and further preferably 0.15% or more. An excessive large Ti content is not preferred since the reduction of the toughness of the steel sheet may be promoted. As a result of various investigations, the Ti content is restricted to 0.50% or less, and Ti is more preferably contained in an amount in a range of 0.40% or less. In the description herein, the "carbonitride" means a compound containing a metal element bonded to at least one of C and N. As for the Ti carbonitride, for example, TiC, TiN, and Ti (C,N) are encompassed therein.

Al is effective as a deoxidizing agent. For achieving the function sufficiently, it is effective to add Al to make an Al content of 0.010% or more. A large amount of Al contained may be a factor that reduces the toughness. The Al content is restricted to 0.20% or less.

Mo is effective for enhancing the corrosion resistance, and may be added depending on necessity. In this case, a Mo content of 0.01% or more is more effective. A large amount of Mo contained may adversely affect the toughness in some cases. The Mo content is in a range of from 0 to 1.50%.

B is effective for enhancing the secondary workability, and may be added depending on necessity. In this case, it is more effective to ensure the content thereof to 0.0010% or more. However, when the B content exceeds 0.0030%, the uniformity of the metal structure may be impaired due to the formation of $Cr_2B$ to reduce the workability in some cases. The B content may be in a range of from 0 to 0.0030%.

K Value

The K value defined by the expression (1) is an index that accurately estimates the Charpy impact value ($J/cm^2$) at 20° C. by the U-notch impact test piece (having the impact direction perpendicular to the rolling direction and the sheet thickness direction) of the steel sheet having a large gauge thickness (a sheet thickness of from 5.0 to 11.0 mm) of the Ti-containing ferritic stainless steel having the aforementioned chemical composition range, from the Cr content in the steel, the solid-dissolved C and N amount, and the average crystal grain diameter.

$$K \text{ value}=-0.07\times Cr-6790\times Free(C+N)-1.44\times d+267 \quad (1)$$

In the expression (1), Cr represents the Cr content (% by mass) in the steel; Free (C+N) represents a value (% by mass) obtained by subtracting the total content (% by mass) of C and N present in the extraction residue recovered by the electrolytic extraction method, from the total content (% by mass) of C and N present in the steel; and d represents the average crystal grain diameter (μm) obtained for an observation surface obtained by a polished cross section (L cross section) in parallel to the rolling direction and the sheet thickness direction, by the intercept method with a linear testing line defined in Annex C of JIS G0551:2013.

According to the detailed investigations by the inventors, it has been found that the toughness of the Ti-containing ferritic stainless steel sheet having a large gauge thickness around ordinary temperature is strongly influenced by the Cr content, the solid-dissolved C and N amount, and the ferritic average crystal grain diameter. It has been confirmed that in the case where the aforementioned chemical composition is satisfied, and the Cr content, the solid-dissolved C and N amount, and the average crystal grain diameter are controlled to make a K value of 150 or more, the reliability for preventing trouble caused by the decrease of the toughness can be sufficiently ensured in the case where the steel sheet having a large thickness is worked into an exhaust pipe flange member and in the case where the resulting exhaust pipe flange member is used. Accordingly, the K value is necessarily 150 or more in the description herein. The solid-dissolved C and N amount and the ferritic average crystal grain diameter in the hot rolled and annealed steel sheet can be controlled by the hot rolling condition described later, and a hot rolled steel sheet having a K value of 150 or more can be selectively produced.

In the expression (1), Free(C+N) corresponds to the solid-dissolved C and N concentration (% by mass). The value of Free(C+N) can be obtained in the following manner. Method for obtaining Free(C+N)

In a non-aqueous electrolytic solution containing 10% by mass of acetylacetone, 1% by mass of tetramethylammonium chloride, and 89% by mass of methyl alcohol, a specimen having a known mass sampled from the steel sheet is applied with a potential of from −100 mV to 400 mV with respect to a saturated calomel electrode (SCE) to dissolve the matrix (metallic substrate) of the specimen completely, then the liquid containing the undissolved matter is filtered with a membrane filter having a pore diameter of 0.05 μm, and the solid matter remaining on the filter is recovered as the extraction residue. C and N in the extraction residue each are analyzed by the high frequency combustion-infrared absorption method for C and the impulse heat melting-thermal conductivity method for N, and the total content of C and N present in the extraction residue Insol (C+N) (% by mass in the steel) is calculated. Free(C+N) (% by mass) is obtained by the following expression (2).

$$Free(C+N)=Total(C+N)-Insol\ (C+N) \quad (2)$$

Herein, Total (C+N) represents the total content (% by mass) of C and N present in the steel, and Insol (C+N) represents the total content (% by mass) of C and N present in the extraction residue.

Hardness

In the case where an exhaust pipe flange member is produced from a steel sheet material, cold forging with a press mold, boring, cutting, and the like are performed. Therefore, the steel sheet material for an exhaust pipe flange member is preferably softened sufficiently. As a result of various investigations, in the case where a Ti-containing ferritic stainless steel sheet having a sheet thickness of from 5.0 to 11.0 mm is worked into an exhaust pipe flange member, it is significantly effective that the steel sheet is softened to a hardness of 170 HV or less. When the steel sheet is harder than that value, the dimensional accuracy of the flange member tends to be deteriorated. The steel sheet cannot be worked into a flange member in some cases. The excessive softening of the steel sheet is inferior in economical efficiency since the load in the production process of the steel sheet is increased. In general, the hardness may be controlled to a range of 130 HV or more. The treatment for softening can be performed by subjecting the hot rolled steel sheet to annealing described later. The hardness herein can be obtained in such a manner that an indenter is pressed into the steel sheet surface at HV 30 (test force: 294.2 N).

Thickness

As described above, there is a large need of a steel sheet having a large gauge thickness with a sheet thickness of from 5.0 to 11.0 mm for a stainless steel material applied to an exhaust pipe flange member of an automobile exhaust gas flow path. On the other hand, with a Ti-containing ferritic stainless steel sheet having a sheet thickness of 5.0 mm or more, the problem of shortage in toughness tends to be conspicuous when an exhaust pipe flange member is produced and when the resulting exhaust pipe flange member is subjected to a severe impact test. In the invention, accordingly, the improvement in toughness is intended for a steel sheet having a sheet thickness of 5.0 mm or more as a target. It is more effective to target a steel sheet having a sheet thickness of 5.5 mm or more. It has been found that with a sheet thickness of 11.0 mm or less, the shortage in toughness in working into an exhaust pipe flange member and in using the member can be significantly avoided by controlling the chemical composition and the K value to the aforementioned ranges. The reliability in toughness can be further enhanced when the sheet thickness is 9.0 mm or less.

Production Method

A production method of the Ti-containing ferritic stainless steel sheet having a large gauge thickness excellent in toughness and workability will be shown below.

Melting and Casting

A cast slab is produced by the continuous casting method. The slab may also be produced by producing a cast ingot by the ingot casting method and forging or bloom rolling the ingot. The thickness of the slab is preferably from 200 to 250 mm.

Heating of Slab

The slab is placed in a heating furnace and heated to a temperature of 950° C. or more. The heating time (i.e., the period of time where the material temperature is maintained at 950° C. or more) may be set, for example, to a range of from 50 to 120 minutes. By heating to a temperature of 950°

C. or more, coarse TiC formed on casting is decomposed to Ti and C, resulting in a structure state where TiC substantially disappeared. TiN is still not completely decomposed at 1,150° C., but there is no particular need to stick to complete dissolution of N. The maximum achieving temperature of the material may be set in a range of 1,120° C. or less, and the material temperature on taking out from the furnace (extraction temperature) is necessarily controlled to the temperature range described later.

Rough Rolling

The slab after heating is taken out at an extraction temperature of from 950 to 1,120° C. from the furnace, and rolled with a roughing mill. When the extraction temperature is higher than the range, the average crystal grain diameter of the recrystallized ferritic phase tends to be coarse, and it may be difficult to provide a hot rolled steel sheet having a K value of 150 or less. The rough rolling may be performed by one pass or plural passes of rolling, so as to provide an intermediate slab having a sheet thickness of from 20 to 50 mm. At this time, it is important to control the surface temperature of the intermediate slab obtained by the rough rolling to from 700 to 850° C. Specifically, the extraction temperature and the rough rolling pass schedule are configured to provide at least the final pass temperature of the rough rolling in a range of from 700 to 850° C. This temperature range overlaps the temperature range where reprecipitation of TiC occurs. When TiC is reprecipitated during the rough rolling from the state where substantially no undissolved TiC remains, fine TiC are formed from many sites. In the intermediate slab, a Ti carbonitride is formed from the many TiC or TiN having been precipitated as nuclei, and finely dispersed therein. The finely dispersed Ti carbonitride exerts a function suppressing the ferritic recrystallized grains from becoming coarse, by the pinning effect. In the case where the rough rolling is performed at a high temperature providing a surface temperature of the intermediate slab exceeding 850° C., the rough rolling is performed at a higher temperature than the temperature where TiC is actively reprecipitated and therefore the pinning effect is not sufficiently exerted to form coarse crystal grains, i.e., the effect of providing fine crystal grains becomes insufficient. In the case where the surface temperature of the intermediate slab is lower than 700° C., on the other hand, there is a factor increasing the deformation resistance in the finish hot rolling described later or making the coiling temperature too low. The total rolling reduction of the rough rolling is preferably from 80 to 90%.

Finish Hot Rolling

The series of hot rolling performed for the intermediate slab until coiling is referred to as "finish hot rolling" herein. The finish hot rolling may be performed with a reversible rolling mill or a tandem continuous rolling mill. The pass schedule is configured to achieve the sheet thickness after the final pass of from 5.0 to 11.0 mm and the coiling temperature described later. During the finish hot rolling, the recrystallized grains are suppressed from being grown by the pinning effect. The total rolling reduction ratio of the finish hot rolling may be, for example, from 65 to 85%.

Coiling

The steel sheet after completing the finish hot rolling is coiled into a coil in a state where the surface temperature is from 650 to 800° C. In the case where the steel sheet is coiled at a temperature lower than 650° C., the high temperature strength is increased, which tends to cause such a state that the steel sheet cannot be coiled into a coil with a normal shape. The occurrence of the abnormal coiling leads to increase of the production cost since the steel sheet is necessarily subjected to a recoiling process. In the case where the steel sheet is coiled at a higher temperature than 800° C., dynamic secondary recrystallization is facilitated, which tends to make the crystal grains coarse. This case may leads to decrease of the K value (i.e., decrease of the toughness). After coiling, the steel sheet may be allowed to cool in the air. The effect provided by the pinning effect may be maintained even though a cooling treatment, such as water cooling, is not performed. The improvement of the low temperature toughness may be largely contributed by the decrease of the crystal grain size. It is considered that the softening of the matrix by decreasing the solid-dissolved C and N also contributes to the improvement of the low temperature toughness. Accordingly, the hot rolled steel sheet having a large gauge thickness of the Ti-containing ferritic stainless steel, which is excellent in toughness can be provided by satisfying the production conditions of the invention.

Hot Rolled Sheet Annealing

The hot rolled steel sheet obtained above is subjected to annealing. The annealing of the hot rolled steel sheet as is just after completing the hot rolling (i.e., so-called "as hot") is referred to as "hot rolled sheet annealing". The steel sheet obtained by the hot rolled sheet annealing (including the steel sheet, from which an oxidized scale has been removed) is referred to as a "hot rolled and annealed steel sheet". The hot rolled sheet annealing is performed by heating to a temperature range of from 800 to 1,100° C., and the temperature and the annealing time are controlled in such a manner that the hardness of the sheet surface of the steel sheet after the annealing is 170 HV or less. When the annealing temperature is lower than 800° C., recrystallization does not proceed sufficiently, and the punching capability in the production of the flange member may be deteriorated. In this case, burr and the like tend to occur, thereby shortening the lifetime of the punching blanking die considerably. When the annealing temperature exceeds 1,100° C., the crystal grains tend to be coarse, which may be a factor deteriorating the quality of the flange member. The appropriate annealing condition for providing a hot rolled and annealed steel sheet with 170 HV or less can be easily set within the aforementioned annealing temperature range by performing in advance a preliminary experiment to comprehend the softening behavior corresponding to the chemical composition and the sheet thickness of the steel. In general, a good result may be obtained by heating to an annealing temperature set in a range of from 800 to 1,100° C. with a soaking time of from 0 to 5 minutes. The soaking time of 0 minute means the case where the material is cooled immediately after the material temperature reaches the prescribed temperature. After the annealing, an oxidized scale on the surface is generally removed by acid cleaning. The hot rolled sheet annealing is efficiently performed with a continuous annealing and acid cleaning line, through which a hot rolled steel sheet having a large gauge thickness can be passed.

EXAMPLES

Steels shown in Table 1 were made, and continuously casted slabs having a thickness of approximately 200 mm were obtained. The chemical compositions of the steels satisfied the requirement of the invention. The continuously casted slab was placed in a heating furnace, and after retaining at a slab heating temperature shown in Table 2 depending on the steel types for from 50 to 100 minutes, the slab was taken out from the furnace and immediately subjected to rough rolling with a roughing mill. The extraction temperature was the same as the slab heating temperature. The rough rolling was performed by from 7 to 9 passes depending on the target finish sheet thickness, and an intermediate slab having a thickness of from 20 to 50 mm was produced. The surface temperature of the intermediate slab was measured at the outlet side of the final pass of the roughing mill. The temperature is shown as "Intermediate slab temperature" in Table 2. The resulting intermediate slab was subjected to finish hot rolling with a continuous hot rolling mill having a 6-stand mill or a reversible hot rolling mill having a coiler furnace, and then coiled, so as to provide a hot rolled steel sheet in a coil form. The coiling temperature was obtained by measuring the surface temperature of the steel sheet immediately before the coiling machine. The thickness of the resulting hot rolled steel sheet is shown in Table 2. The hot rolled steel sheet was subjected to hot rolled sheet annealing and acid pickling by passing through a continuous annealing and acid pickling line, so as to provide a hot rolled and annealed steel sheet. The hot rolled sheet annealing condition is shown in Table 2.

test pieces were cut out from near the both ends in the width direction of the steel strip (i.e., the direction perpendicular to the rolling direction) and near the center thereof, and the following test was performed for the nine sampling positions in total per one coil of the hot rolled and annealed steel sheet.

The value of Free (C+N) and the average crystal grain diameter d were measured in the aforementioned manners, from which the K value was obtained by the expression (1). A U-notch impact test piece was produced and subjected to the Charpy impact test at 20° C. according to JIS Z2242: 2005. The direction for applying an impact with a hammer (i.e., the depth direction of the U-notch) was the direction perpendicular to the rolling direction and the sheet thickness direction (i.e., the sheet width direction of the hot rolled and annealed steel strip). The hardness of the sheet surface was measured in the aforementioned manner. No large fluctuation was found among the measurement results at the nine sampling positions in the hot rolled and annealed steel sheet, and for strictly evaluating the results, the measurement result at the sampling position, at which the lowest value for the K value (i.e., the worst value) was obtained, was designated as the evaluation value of the steel sheet. The results are shown in Table 2.

TABLE 1

| | Chemical composition (% by mass) | | | | | | | | | | |
|---|---|---|---|---|---|---|---|---|---|---|---|
| No. | C | Si | Mn | P | S | Mo | Cr | N | Al | Ti | B |
| 1 | 0.008 | 0.55 | 0.41 | 0.035 | 0.001 | 0.10 | 17.9 | 0.012 | 0.07 | 0.21 | — |
| 2 | 0.005 | 0.45 | 0.38 | 0.028 | 0.001 | 0.05 | 11.2 | 0.006 | 0.05 | 0.19 | — |
| 3 | 0.007 | 0.54 | 0.35 | 0.029 | 0.005 | 0.05 | 10.1 | 0.008 | 0.03 | 0.17 | — |
| 4 | 0.009 | 0.35 | 0.54 | 0.038 | 0.001 | 0.04 | 16.8 | 0.013 | 0.08 | 0.28 | — |
| 5 | 0.008 | 0.04 | 0.45 | 0.033 | 0.002 | 0.05 | 17.5 | 0.011 | 0.05 | 0.25 | — |
| 6 | 0.008 | 0.03 | 0.48 | 0.029 | 0.001 | 1.02 | 18.4 | 0.012 | 0.08 | 0.29 | — |
| 7 | 0.003 | 0.58 | 0.39 | 0.035 | 0.003 | — | 11.4 | 0.005 | 0.04 | 0.20 | — |
| 8 | 0.008 | 0.15 | 0.58 | 0.037 | 0.002 | 0.02 | 17.6 | 0.014 | 0.08 | 0.24 | — |
| 9 | 0.011 | 0.54 | 0.45 | 0.028 | 0.001 | 0.99 | 18.4 | 0.015 | 0.11 | 0.39 | — |
| 10 | 0.005 | 0.45 | 0.38 | 0.039 | 0.002 | — | 13.9 | 0.009 | 0.06 | 0.25 | 0.0025 |
| 21 | 0.008 | 0.45 | 0.48 | 0.039 | 0.001 | — | 16.8 | 0.012 | 0.11 | 0.22 | — |
| 22 | 0.004 | 0.55 | 0.39 | 0.038 | 0.002 | — | 10.5 | 0.007 | 0.05 | 0.25 | — |
| 23 | 0.008 | 0.65 | 0.38 | 0.031 | 0.001 | — | 17.8 | 0.008 | 0.09 | 0.29 | — |
| 24 | 0.007 | 0.25 | 0.34 | 0.033 | 0.002 | — | 10.8 | 0.013 | 0.08 | 0.25 | — |
| 25 | 0.009 | 0.51 | 0.35 | 0.031 | 0.002 | — | 17.8 | 0.011 | 0.05 | 0.27 | — |
| 26 | 0.008 | 0.45 | 0.33 | 0.029 | 0.001 | 0.98 | 18.4 | 0.012 | 0.07 | 0.29 | — |
| 27 | 0.004 | 0.39 | 0.29 | 0.038 | 0.005 | — | 11.4 | 0.005 | 0.02 | 0.07 | — |
| 28 | 0.006 | 0.45 | 0.38 | 0.032 | 0.003 | — | 17.6 | 0.014 | 0.05 | 0.11 | — |
| 29 | 0.008 | 0.54 | 0.41 | 0.030 | 0.001 | 1.04 | 18.4 | 0.015 | 0.08 | 0.09 | — |

For each of the hot rolled and annealed steel sheets, sheet material specimens for testing were sampled near the both ends in the longitudinal direction of the steel strip and near the center thereof. From each of the three sheet materials,

TABLE 2

| | | | | | | Hot rolled and annealed steel sheet | | | | | |
|---|---|---|---|---|---|---|---|---|---|---|---|
| Class | No. | Slab heating temperature (° C.) | Intermediate slab temperature (° C.) | Coiling temperature (° C.) | Hot rolled sheet annealing temperature (° C.) | Sheet thickness (mm) | Free(C + N) (% by mass) | Average crystal grain diameter d (μm) | K value | 20° C. U-notch impact value (J/cm$^2$) | Sheet surface hardness (HV) |
| Example of Invention | 1 | 1080 | 840 | 785 | 1080 | 8.5 | 0.006 | 40 | 167.4 | 158 | 165 |
| | 2 | 990 | 700 | 680 | 800 | 9.8 | 0.004 | 20 | 210.3 | 205 | 142 |
| | 3 | 1000 | 700 | 675 | 1050 | 7.9 | 0.005 | 32 | 186.3 | 191 | 138 |
| | 4 | 1060 | 830 | 735 | 1000 | 5.4 | 0.005 | 40 | 174.3 | 164 | 157 |
| | 5 | 1100 | 830 | 740 | 950 | 10.9 | 0.002 | 68 | 154.3 | 153 | 160 |
| | 6 | 1050 | 840 | 690 | 1095 | 5.2 | 0.003 | 32 | 199.3 | 202 | 168 |
| | 7 | 980 | 785 | 740 | 810 | 9.8 | 0.001 | 25 | 223.4 | 225 | 148 |
| | 8 | 1070 | 820 | 725 | 1080 | 9.2 | 0.002 | 32 | 206.1 | 196 | 151 |
| | 9 | 1110 | 835 | 718 | 1050 | 10.3 | 0.006 | 52 | 150.1 | 152 | 166 |
| | 10 | 1010 | 810 | 795 | 1000 | 5.1 | 0.004 | 48 | 169.7 | 160 | 154 |

TABLE 2-continued

| Class | No. | Slab heating temperature (° C.) | Intermediate slab temperature (° C.) | Coiling temperature (° C.) | Hot rolled sheet annealing temperature (° C.) | Hot rolled and annealed steel sheet ||||||
|---|---|---|---|---|---|---|---|---|---|---|---|
| | | | | | | Sheet thickness (mm) | Free(C + N) (% by mass) | Average crystal grain diameter d (μm) | K value | 20° C. U-notch impact value (J/cm$^2$) | Sheet surface hardness (HV) |
| Comparative Example | 21 | 1220 | 950 | 905 | 1100 | 5.2 | 0.010 | 78 | 85.6 | 79 | 179 |
| | 22 | 1215 | 940 | 900 | 1050 | 9.7 | 0.000 | 108 | 110.7 | 108 | 172 |
| | 23 | 1275 | 1050 | 945 | 1070 | 10.5 | 0.009 | 90 | 75.0 | 70 | 187 |
| | 24 | 1150 | 940 | 860 | 840 | 9.5 | 0.008 | 115 | 46.3 | 40 | 195 |
| | 25 | 1200 | 860 | 815 | 1090 | 8.1 | 0.003 | 78 | 133.1 | 135 | 184 |
| | 26 | 1225 | 920 | 850 | 1050 | 5.4 | 0.000 | 98 | 124.6 | 123 | 178 |
| | 27 | 1205 | 900 | 810 | 800 | 6.0 | 0.006 | 65 | 131.9 | 134 | 175 |
| | 28 | 1230 | 907 | 865 | 1070 | 5.5 | 0.006 | 58 | 141.5 | 145 | 165 |
| | 29 | 1090 | 770 | 610 | 1050 | 9.8 | 0.013 | 40 | 119.8 | 125 | 158 |

The steel sheets produced under the condition where the K value was 150 or more according to the invention (Examples of Invention) had an impact value by the U-notch impact test piece at 20° C. of 150 J/cm$^2$ or more and had good toughness. The softening to 170 HV or less was achieved by the annealing. Accordingly, it is judged that the steel sheets can be sufficiently worked into an exhaust pipe flange member, and the resulting flange member has sufficient toughness in use. It was also confirmed that the excellent effect of improving toughness was stably obtained over the entire length of the steel strip in the production of the steel strip with the continuous line.

By using the steel sheets of Examples of Invention, a cold forging test, a press boring test, and a cutting test simulating the working into an exhaust pipe flange member were performed. As a result, a failure in production due to shortage in toughness or shortage in softening was not observed. The resulting cold forged members were subjected to the falling weight test under the extremely severe condition defined by the applicant. As a result, in all the test pieces obtained from the steel sheets of Examples of Invention, problems, such as cracking, due to shortage in toughness did not occur.

In Nos. 21, 22, 23, 24, 25, 26, 27, and 28 as Comparative Examples, the pinning effect due to the deposition of TiC and the like was not obtained since the slab heating temperature, the intermediate slab temperature, or the coiling temperature was deviated higher than the examples of the invention, and the average crystal grain diameter was increased, resulting in decrease of the toughness. No. 29 satisfied the requirements of the invention for the slab heating temperature and the intermediate slab temperature, but the coiling temperature was lower to deteriorate the shape of the coiled coil. Furthermore, the contents of C and N in the steel were large, but the amount of Ti was small, and thus Free (C+N) was increased, resulting in decrease of the toughness.

By using the steel sheets of Comparative Examples, a cold forging test, a press boring test, and a cutting test simulating the working into an exhaust pipe flange member were performed under the same conditions as above. As a result, in No. 22 having hardness that was slightly higher than the range of the invention, cracks occurred in the boring test due to the low toughness thereof. In Nos. 21, 23, 24, 25, 26, 27, 28, and 29, the production of a flange member therefrom was difficult due to the low toughness and the large hardness thereof.

REFERENCE SIGN LIST

1 Steel pipe
2 Flange member

The invention claimed is:

1. A Ti-containing ferritic stainless steel sheet for an exhaust pipe flange member, having a chemical composition containing, in terms of percentage by mass, from 0.003 to 0.030% of C, 2.0% or less of Si, 2.0% or less of Mn, 0.050% or less of P, 0.040% or less of S, from 10.0 to 19.0% of Cr, 0.030% or less of N, from 0.07 to 0.50% of Ti, and from 0.010 to 0.20% of Al, with the balance of Fe and unavoidable impurities, having a K value defined by the following expression (1) of 150 or more, having a hardness of a sheet surface of 170 HV or less, and having a sheet thickness of from 5.0 to 11.0 mm:

$$K \text{ value} = -0.07 \times Cr - 6790 \times Free(C+N) - 1.44 \times d + 267 \quad (1)$$

wherein in the expression (1), Cr represents a Cr content (% by mass) in the steel; Free(C+N) represents a value (% by mass) obtained by subtracting a total content (% by mass) of C and N present in an extraction residue recovered by an electrolytic extraction method, from a total content (% by mass) of C and N present in the steel; and d represents an average crystal grain diameter (μm) obtained for an observation surface obtained by a polished cross section (L cross section) in parallel to a rolling direction and a sheet thickness direction, by an intercept method with a linear testing line defined in Annex C of JIS G0551:2013.

2. The Ti-containing ferritic stainless steel sheet for an exhaust pipe flange member according to claim 1, wherein the Ti-containing ferritic stainless steel sheet has the chemical composition further containing, in terms of percentage by mass, 1.50% or less of Mo.

3. The Ti-containing ferritic stainless steel sheet for an exhaust pipe flange member according to claim 1, wherein the Ti-containing ferritic stainless steel sheet has the chemical composition further containing, in terms of percentage by mass, 0.0030% or less of B.

4. A method for producing the Ti-containing ferritic stainless steel sheet for an exhaust pipe flange member according to claim 1, comprising:
a step of heating a slab of a steel having a chemical composition in a heating furnace, then taking out the slab at a temperature of from 950 to 1,120° C. from the furnace, rolling the slab with a roughing mill to provide an intermediate slab having a sheet thickness of from 20 to 50 mm and a surface temperature of from 700 to 850° C., then hot-rolling the intermediate slab to a thickness of from 5.0 to 11.0 mm, and then coiling at a surface temperature of from 650 to 800° C., so as to provide a hot rolled steel sheet; and a step of annealing the hot rolled steel sheet at from 800 to 1,100° C., thereby providing a hot rolled and annealed steel sheet having a hardness of a sheet surface of 170 HV or less.

5. A flange member comprising the Ti-containing ferritic stainless steel sheet according to claim 1.

6. The flange member according to claim 5, wherein the flange member is an exhaust pipe flange member of an automobile.

\* \* \* \* \*